United States Patent [19]

Nolt, Jr.

[11] 4,420,672

[45] Dec. 13, 1983

[54] METHOD AND APPARATUS TO PRODUCE ELECTROSLAG T-JOINTS WHERE FILLETS ARE REQUIRED

[75] Inventor: James R. Nolt, Jr., Mt. Wolf, Pa.

[73] Assignee: Allis-Chalmers Corporation, Milwaukee, Wis.

[21] Appl. No.: 260,073

[22] Filed: May 4, 1981

Related U.S. Application Data

[63] Continuation-in-part of Ser. No. 43,006, May 29, 1979, abandoned.

[51] Int. Cl.³ .............................................. B23K 25/00
[52] U.S. Cl. .................................... 219/73.1; 219/126; 219/160
[58] Field of Search ..................... 219/73.1, 126, 160

[56] References Cited

U.S. PATENT DOCUMENTS 3,839,619 10/1974 Normando .......................... 219/160
4,207,454 6/1980 Safonnikou ........................ 219/73.1

FOREIGN PATENT DOCUMENTS 448340 5/1966 Japan ................................. 219/73.1
51-12356 1/1976 Japan ................................. 219/73.1
918070 2/1963 United Kingdom ............... 219/73.1

Primary Examiner—Elliot A. Goldberg
Attorney, Agent, or Firm—Timothy R. Conrad

[57] ABSTRACT

A method and apparatus for producing electroslag T-joints where fillets are required is provided by utilizing a water-cooled copper shoe with a slag relief notch placed along the weld joints to provide a dam for the fillet material; the location of the slag relief notch in the shoes of various radii is determined according to a precise formula which provides the required results.

7 Claims, 6 Drawing Figures

METHOD AND APPARATUS TO PRODUCE ELECTROSLAG T-JOINTS WHERE FILLETS ARE REQUIRED

RELATED APPLICATION

This Application is a continuation-in-part of United States patent application Ser. No. 043,006 filed May 29, 1979 now abandoned.

BACKGROUND OF THE INVENTION

In forming runners in Francis-Type turbines, the blades of the runners are normally welded to the lower band and to the crown. This welding of necessity must be done by hand and usually requires a tremendous amount of hand grinding to produce fillets of the desired contours with the necessary smoothness. This hand grinding of the welded T-joints to produce the desired fillet contour materially increases the costs of the manufacturing of the turbine buckets. The hand grinding operation often required regrinding after inspection so as to pick up areas of the weld which had not been ground properly to the desired contour.

To alleviate the necessity of hand grinding or, more accurately, to reduce the amount of hand grinding necessary to mold the proper contour fillet, a method and apparatus therefor has been provided which eliminates excess grinding of the fillet joint and provides for a slag relief notch for the slag to creep into from the weld.

It is the general object of the present invention to produce fillets when electroslag welding T-joints, which require little upgrading to eliminate notches at the toe of the weld. Still another object of the present invention is to provide means whereby fillets in electroslag welding of T-joints may be produced of any type of any radius. Yet another object of the present invention is the provision of a shoe with a slag-relief notch whereby nearly any fillet shape can be produced.

SUMMARY OF THE INVENTION

The method and apparatus for producing fillets when electroslag welding of T-joints for providing structure which request little upgrading is accomplished by means of water-cooled copper shoes which confine the material of the weld to a specified area and provide a slag relief notch for slag to escape from the deposited weld material but only in limited quantity necessary to produce a solid joint. The slag which escapes into the relief notches is minimum thereby requiring the minimum of hand-grinding to remove.

DESCRIPTION OF THE INVENTION

Figure 1:
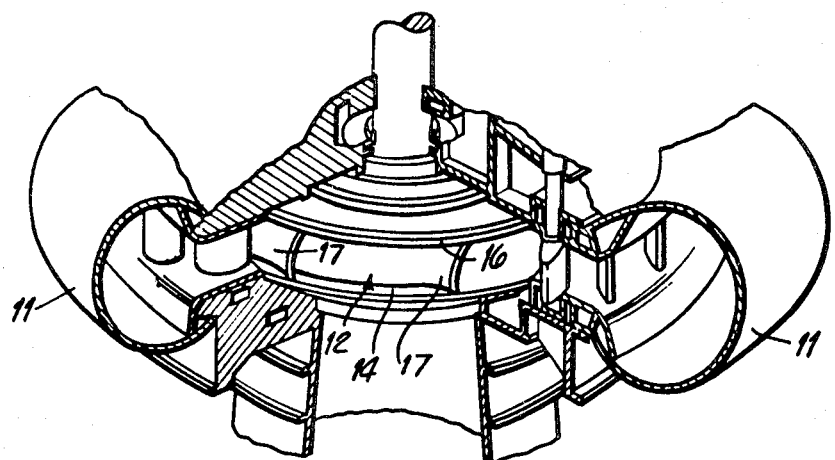
FIG. 1 shows a portion of the spiral case of a reversible pump turbine including the impeller runners to which this invention is directed.
Figure 2:
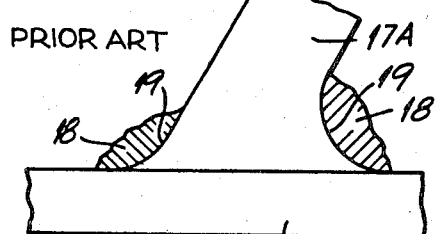
FIG. 2 is a fragmentary view of the impeller plate and impeller welded thereto by prior methods showing the excess metal which was required to be removed by hand grinding to form the proper contour fillet.
Figure 5:
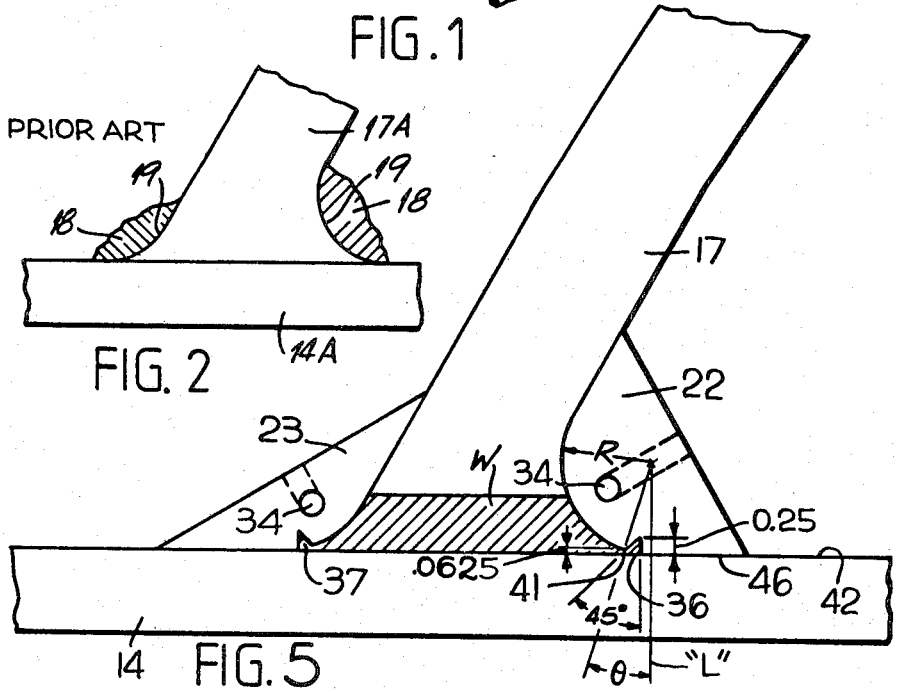
FIG. 5 is an enlarged fragmentary view of an impeller plate with an impeller blade welded thereto showing the copper shoes in place for forming the desired contoured fillet and the geometry for determining the location of a notch.

In FIG. 1, there is shown a portion of a reversible pump turbine which includes the spiral case 11 having communication with the impeller or runner 12. The impeller 12 includes the lower band or plate 14 and an upper crown plate 16 to which are welded the buckets or blades 17. In the past, as indicated in FIG. 2, it has been the custom to weld the blade 17A to the lower band or plate of 14A by electroslag welding which resulted in depositing excess weld material at the fillet joint. This excess weld material is indicated by the reference 18 and necessitated that the excess material be ground away manually by hand operation of a grinder to produce the desired contour of the fillet joint 19 so as to form the desired radius. As can be well imagined, the hand grinding of the excess material 18 from the fillet to produce the desired contour 19 was laborious and required many man-hours to accomplish the desired results.

Figure 4:
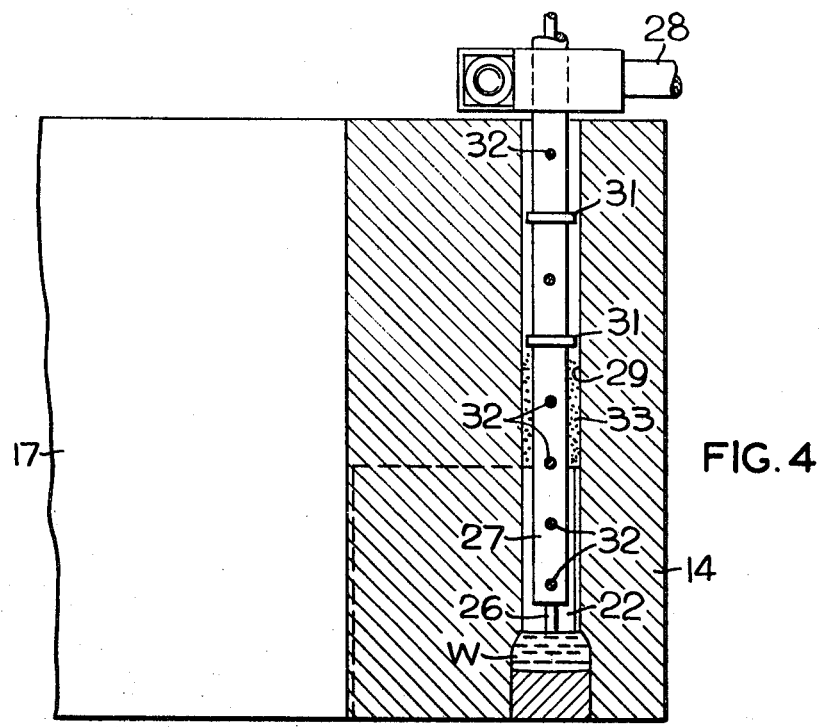
FIG. 4 is a view taken in a plane represented by the lines IV—IV in FIG. 3, showing the electrode wire and guide tube in relation to a water-cooled shoe and the space to be filled with the weld material.
Figure 3:
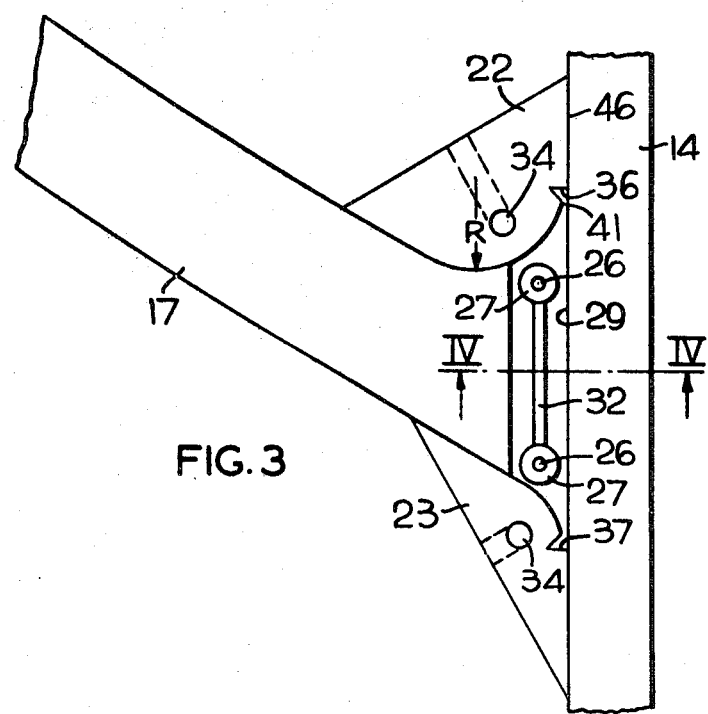
FIG. 3 is an enlarged fragmentary view of an impeller plate and an impeller blade to be welded thereto and the location and placement of the electrode wire.

To minimize the hand grinding method, a novel means and apparatus has been conceived and is shown in FIG. 3. As there shown, the blade 17 is welded to the lower band 14 by electroslag depositing means in conjunction with water-cooled copper shoes 22 and 23 located at the inside and outside of the impeller blade 17 respectively. The electrode wire or fillet material 26, shown in FIGS. 3 and 4, is fed in wire form through a standard commercially available electrode wire guide tube or consumable nozzle 27 to which current is applied via conductors 28 one of which is shown. The electrode 26 is fed through the guide tube by means of a standard commercial available wire feeder (not shown). As shown, the guide tube 27 with the electrode 26 therein is supported within the space or joint 29 and placed in the joint prior to welding in which the weld metal material is to be deposited. Such support is provided by a plurality of ring insulators 31 which are mounted in coaxial relationship on the guide tube 27. In the illustrative arrangement as depicted in FIGS. 3 and 4, two electrode wires in their associated guide tubes are shown as being used in the weld process. The two guide tubes are bent to fit the joint curvature and are maintained in operative position relative to each other within the joint by means of a plurality of transversely extending rods 32. Flux 33 is manually added to the joint above the copper shoe 22. As shown, the shoe 22 has a water passage 34 for cooling the shoe and is formed with a radius R to produce the desired fillet contour. The weld material W is deposited by electroslag welding and is retained in the area between the impeller blade and lower plate by means of the curvature of the shoes 22 and 23 which forms a dam for conforming the deposited fillet material to the area and in the desired contour. The parts 14 and 17 are orientated during the welding process so that the joint, at the point of welding, is in a vertical plane. To provide for the expansion, displacement and relief of the slag from the weld material, there are provided slag relief notches 36 and 37 in the shoes 22 and 23, respectively, which extend along the length of the shoes. Slag fills the notches 36 and 37 and rises to the top of the joint. There is always a thin film of slag between the cooling shoes 22 and 23 and the molten weld metal. The design and location of the slag relief notches such as the notch 36 provides a means of obtaining a smooth tie-in of the fillet with the flange member of a T-joint. Critical to the success of the shoe design is the maintenance of a 0.0625-inch dimension from the tip 41 of the notch to the flange or plate member 14 and also of the cross-sectional area of the notch. The height of the notch 36 is equal to 0.25 inches. The location of the tip 41 of notch 36 on shoes of various radii can be determined by the following equation:

$$\theta = \text{Arc Cos } (R-0.0625/R)$$

where R is the desired radius of the T-joint fillet in inches. The angle $\theta$ being measured from a theoretical line "L" which is perpendicular to the surface of 42 of member 14. With this arrangement it can be seen that the shoe 22 is provided with a foot portion 46 which provides for the positioning of the tip 41 of the notch 36 0.0625 inches above the surface of the lower band 14. Thus, with the depositing of the fillet material, the slag underruns the tip 41 of the notch 36 and expands into the notch space.

Figure 6:
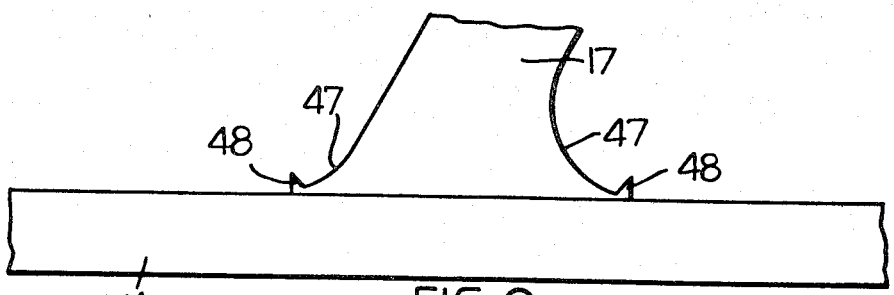
FIG. 6 is an enlarged view of the structure shown in FIG. 5 with the copper shoes removed showing the slight amount of excess slag metal to be removed by hand in contrast with that shown in FIG. 2.

As shown in FIG. 6, upon the removal of the shoes 22 and 23, the fillet contour 47 has the desired smooth tie-in with the lower band member 14 leaving only the relatively small slag material 48 which is easily removed by hand grinding. It is apparent that the removal of the slag material 48, shown in FIG. 6, will require much less effort and time when compared with the amount of material 18 that was required to be removed by hand in the prior methods, as shown in FIG. 2.

The embodiments of the invention in which an exclusive property or privilege is claimed are defined as follows:

1. A method of forming a T-joint having fillets of a desired contour between two angularly related members comprising the steps of:
    positioning fillet material retaining means along the joint to be formed;
    providing fillet material in the joint prior to welding;
    providing flux to the joint at one side of the fillet material retaining means;
    providing slag relief means in said fillet material retaining means adjacent to the head of the T-joint to be formed;
    providing communicating means between the T-joint space and the slag relief means for slag to run into the relief means;
    providing electric current to the members to generate heat to melt the base material of the members and the fillet material to a molten state.

2. A method according to claim 1 including the steps of:
    determining the location of the slag relief means according to the formula:

$$\theta = \text{Arc Cos } (R-0.625/R)$$

Where R is the desired radius of T-joint fillets in inches and $\theta$ is the angle which defines the location of the slag relief means measured from a theoretical line perpendicular to the surface of the member to which the slag relief means is adjacent and which passes through the center of curvature and toward the other members.

3. Apparatus for molding a T-joint fillet between two members in which the fillet will have substantially the desired contour in the as-deposited condition by electroslag welding;
    a metallic shoe having a surface defining the desired T-joint fillet contour between the two members;
    a longitudinally extending slag relief notch formed in said shoe in position to be in communication with space in which the fillet material is to be deposited to receive slag from the deposited fillet material; and,
    means for depositing the fillet material by electroslag welding in the T-joint between the two members.

4. Apparatus according to claim 3 in which the location of the slag relief notch in the surface of said shoe is determined by the formula:

$$\theta = \text{Arc Cos } R-0.0625/R$$

where R is the desired radius of the fillet expressed in inches and $\theta$ is the angle between a theoretical line peripendicular to the surface of one of the members to which the slag relief notch will be adjacent and which passes through the center of curvature and measured toward the other members.

5. Apparatus according to claim 4 wherein the slag relief notch formed in said shoe presents a corner adjacent to the radius surface defining the fillet contour which is spaced 0.0625 inches from the surface of one of the members which serves as the flange of the T-joint fillet.

6. Apparatus according to claim 5 wherein said shoe is formed of copper material and is provided with water circulating means therein for cooling the shoe.

7. A method according to claim 2 including the steps of:
    preplacing the fillet material in the T-joint to be formed prior to welding; and
    adding flux to the T-joint to be formed above the fillet material retaining means.

* * * * *